US011985318B2

(12) United States Patent
Furht et al.

(10) Patent No.: US 11,985,318 B2
(45) Date of Patent: May 14, 2024

(54) ENCODING VIDEO WITH EXTENDED LONG TERM REFERENCE PICTURE RETENTION

(71) Applicant: OP Solultions, LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solultions, LLC, Amherst, MA (US)

( * ) Notice: Subject to any disclaimer, the term of this patent is extended or adjusted under 35 U.S.C. 154(b) by 0 days.

(21) Appl. No.: 18/104,874

(22) Filed: Feb. 2, 2023

(65) Prior Publication Data

US 2023/0179767 A1 Jun. 8, 2023

Related U.S. Application Data

(63) Continuation of application No. 17/386,210, filed on Jul. 27, 2021, now Pat. No. 11,595,652, which is a continuation of application No. PCT/US2015/000414, filed on Jan. 28, 2020.

(60) Provisional application No. 62/797,806, filed on Jan. 28, 2019.

(51) Int. Cl.
*H04N 19/124* (2014.01)
*H04N 19/44* (2014.01)
*H04N 19/50* (2014.01)

(52) U.S. Cl.
CPC .......... *H04N 19/124* (2014.11); *H04N 19/44* (2014.11); *H04N 19/50* (2014.11)

(58) Field of Classification Search
CPC ...... H04N 19/124; H04N 19/44; H04N 19/50; H04N 19/70; H04N 19/58
See application file for complete search history.

(56) References Cited

U.S. PATENT DOCUMENTS

2014/0003538 A1* 1/2014 Ramasubramonian ...................... H04N 19/58 375/240.25
2017/0201751 A1* 7/2017 Seo ...................... H04N 19/176
2017/0318323 A1* 11/2017 Wang ................... H04N 19/105
2017/0359590 A1* 12/2017 Zhang .................. H04N 19/423
2020/0195919 A1* 6/2020 Tourapis ............. H04N 19/573

FOREIGN PATENT DOCUMENTS

CN 104871540 A * 8/2015 .......... H04N 19/105
CN 105049894 B * 3/2018 .......... H04L 1/1607
WO WO-2017062377 A1 * 4/2017 .......... H04N 19/105

* cited by examiner

*Primary Examiner* — Dramos Kalapodas
(74) *Attorney, Agent, or Firm* — OP Solutions IP Department; Paul Ackerman

(57) ABSTRACT

An encoder for video encoding and decoding with long term reference picture retention. The encoder generates an encoded bitstream for a compliant decoder. At the decoder, coded pictures are decoded using a list of references pictures, of which at least one is a long term reference picture. A first picture is decoded using the long term reference picture. A second picture is decoded without using the long term reference picture which is inactive but is retained in a buffer. A subsequent picture is then decoded again using the long term reference picture.

5 Claims, 6 Drawing Sheets

400

410 ENCODING A SEQUENCE OF VIDEO FRAMES INCLUDING DETERMINING ONE OR MORE EXTENDED LONG TERM REFERENCE FRAMES (eLTR).

420 DETERMINING eLTR FRAME RETENTION TIMES (TRn)

430 DETERMINING ADDITIONAL SIGNALING PARAMETERS

440 INCLUDING THE eLTR RETENTION TIMES (TRn) AND ADDITIONAL SIGNALING PARAMETERS IN THE BITSTREAM

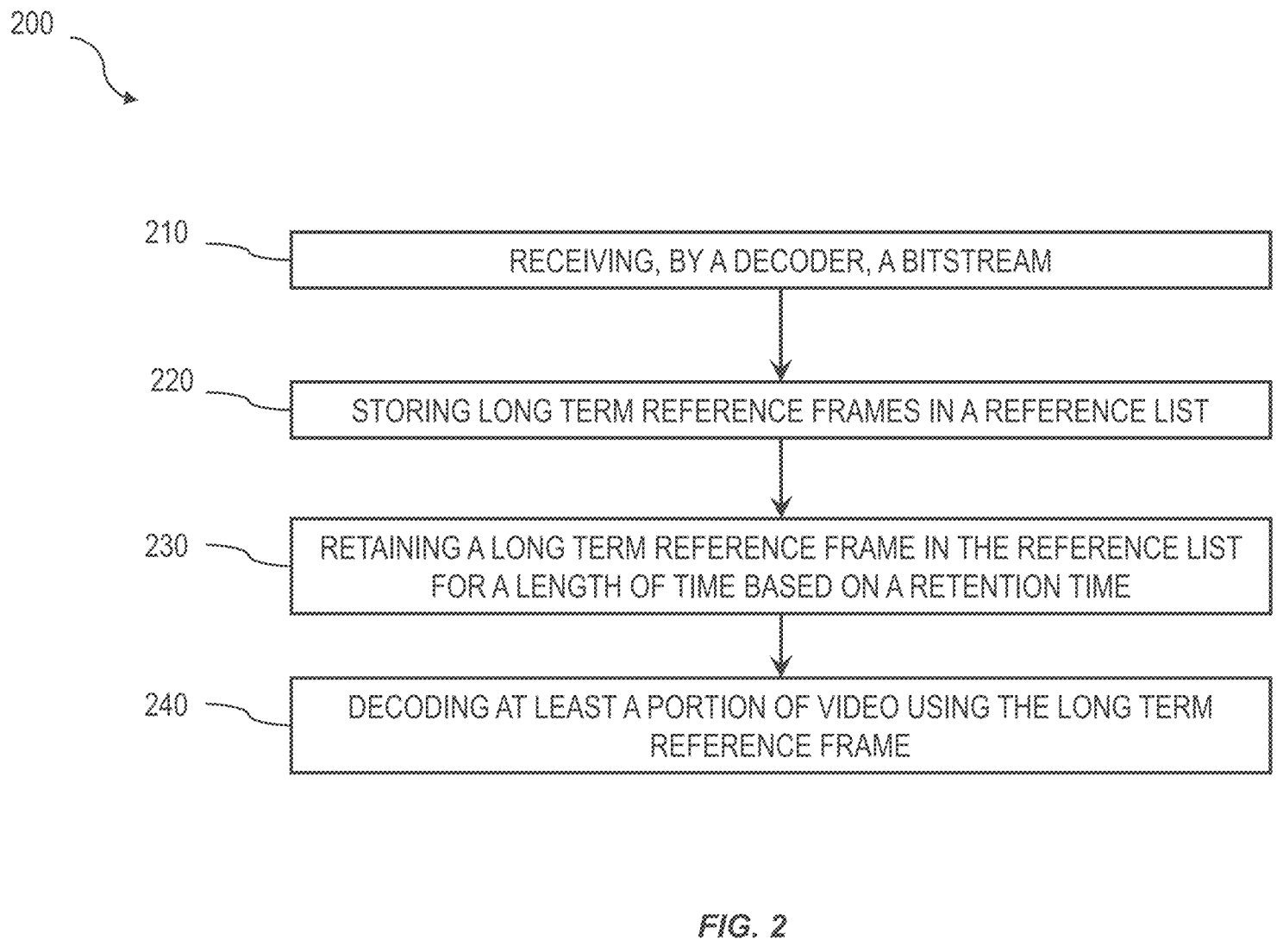

200

210 RECEIVING, BY A DECODER, A BITSTREAM

220 STORING LONG TERM REFERENCE FRAMES IN A REFERENCE LIST

230 RETAINING A LONG TERM REFERENCE FRAME IN THE REFERENCE LIST FOR A LENGTH OF TIME BASED ON A RETENTION TIME

240 DECODING AT LEAST A PORTION OF VIDEO USING THE LONG TERM REFERENCE FRAME

FIG. 2

ENCODING VIDEO WITH EXTENDED LONG TERM REFERENCE PICTURE RETENTION

CROSS-REFERENCE TO RELATED APPLICATIONS

This application is a continuation of U.S. patent application Ser. No. 17/386,210, filed on Jul. 27, 2021 and titled "EXPLICIT SIGNALING OF EXTENDED LONG TERM REFERENCE PICTURE RETENTION," which application claims the benefit of priority of International Patent Application Serial No. PCT/US20/15414, filed on Jan. 28, 2020, and titled "EXPLICIT SIGNALING OF EXTENDED LONG TERM REFERENCE PICTURE RETENTION," and which claims the benefit of priority of U.S. Provisional Patent Application Ser. No. 62/797,806, filed on Jan. 28, 2019, and titled "EXPLICIT SIGNALING OF EXTENDED LONG TERM REFERENCE PICTURE RETENTION," each of which is incorporated by reference herein in its entirety.

FIELD OF THE INVENTION

The present invention generally relates to the field of video compression. In particular, the present invention is directed to explicit signaling of extended long term reference picture retention.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC) and H.264) standard. Motion compensation can describe a picture in terms of the transformation of a reference picture to the current picture. The reference picture can be previous in time when compared to the current picture, from the future when compared to the current picture, or can include a long-term reference (LTR) frame. When images can be accurately synthesized from previously transmitted and/or stored images, compression efficiency can be improved.

Long term reference (LTR) frames have been used in video coding standards such as MPEG-2, H.264 (also referred to as AVC or MPEG-4 Part 10), and H.265 (also referred to as High Efficiency Video Coding (HEVC)). A frame marked as an LTR frame in the video bitstream is available for use as a reference until it is explicitly removed by bitstream signaling. LTR frames improve prediction and compression efficiency in scenes that have static background over an extended period (e.g., background in a video conference or video of parking lot surveillance). However, overtime, the background of a scene gradually changes (e.g., cars when parked in an empty spot become part of the background scene). Updating the LTR frame thus improves compression performance by allowing a better prediction.

Current standards such as H.264 and H.265 allow updating of LTR frames by signaling a newly decoded frame to be saved and made available as a reference frame. Such updates are signaled by the encoder and an entire frame is updated. But updating the entire frame can be costly. And when an LTR frame is updated, the prior LTR frame is discarded. If the static background associated with the prior and discarded LTR frame occurs again in the video (e.g., as in videos which switches from a first scene to a second scene, and then back to the first scene), the prior LTR frame must again be encoded in the bitstream, which reduces compression efficiency.

SUMMARY OF THE DISCLOSURE

In one embodiment, a video encoder is configured to encode a bitstream to be received by a compliant decoder which is in turn configured to receive the bit stream including signaling information and a plurality of coded pictures including first, second, and third coded pictures. The compliant decoder is configured to decode the plurality of pictures including the first, second and third pictures from the encoder and store the decoded pictures in a decoded picture buffer. In this regard, the decoder decodes the first picture by forming a first list of active reference pictures from the pictures in the buffer, one of the active reference pictures being a long term reference picture, and decodes a block of said first picture using the long term reference picture. The decoder further acts on the encoded bitstream to decode the second picture by forming a second list of active reference pictures from the pictures in the buffer, the second list not including the long term reference picture and, in response to at least one parameter in the signaling information, indicating that the long term reference picture is inactive as a reference picture while continuing to store the long term reference picture in the buffer. The decoder further acts on the encoded bitstream from the encoder by to decode the third picture by forming a third list of active reference pictures from the pictures in the buffer including, in response to at least one parameter in the signaling information, changing the indication of the long term reference picture from inactive to active as a reference picture and including the long term reference picture in the third list, and decoding a block from the third picture using the long term reference picture.

In another aspect, a method includes storing, by a decoder, a buffer of previously decoded pictures from a bitstream, receiving, by the decoder, a current coded picture in the bitstream, determining, by the decoder and for the current coded picture, a list of pictures from among the previously decoded pictures in the buffer, wherein the list of pictures further includes at least a first picture that is active as a reference picture for the current picture and at least a second picture that is inactive as a reference picture for the current picture, wherein the at least a second picture is active as a reference picture for a subsequent coded picture in the bitstream, using, by the decoder, the at least a first picture to form a prediction for a coding unit of the current picture, determining, by the decoder that the at least a first picture will no longer be used as a reference picture for any later picture in the bitstream and the at least a first picture has been output for display, and removing, by the decoder, the at least a first picture from the buffer.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a process flow diagram illustrating an example process of extended long-term reference (eLTR) frame retention in which an eLTR frame is retained in the reference list;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

A long-term reference picture (LTR) may be used for better prediction of video frames in the cases where certain portions of the frame become occluded then uncovered repeatedly over time. Traditionally, LTR is used over a duration of a scene or group-of-pictures, after which it is replaced or discarded.

Some implementations of the current subject matter extend the utility of LTR use by selecting best candidate LTRs for retention in a reference list. In some implementations, explicitly signaled extended long-term reference (eLTR) frames may be retained in a reference list for explicitly signaled lengths of time. Some implementations of the current subject matter may provide significant compression efficiency gains compared to some existing approaches.

Figure 1:
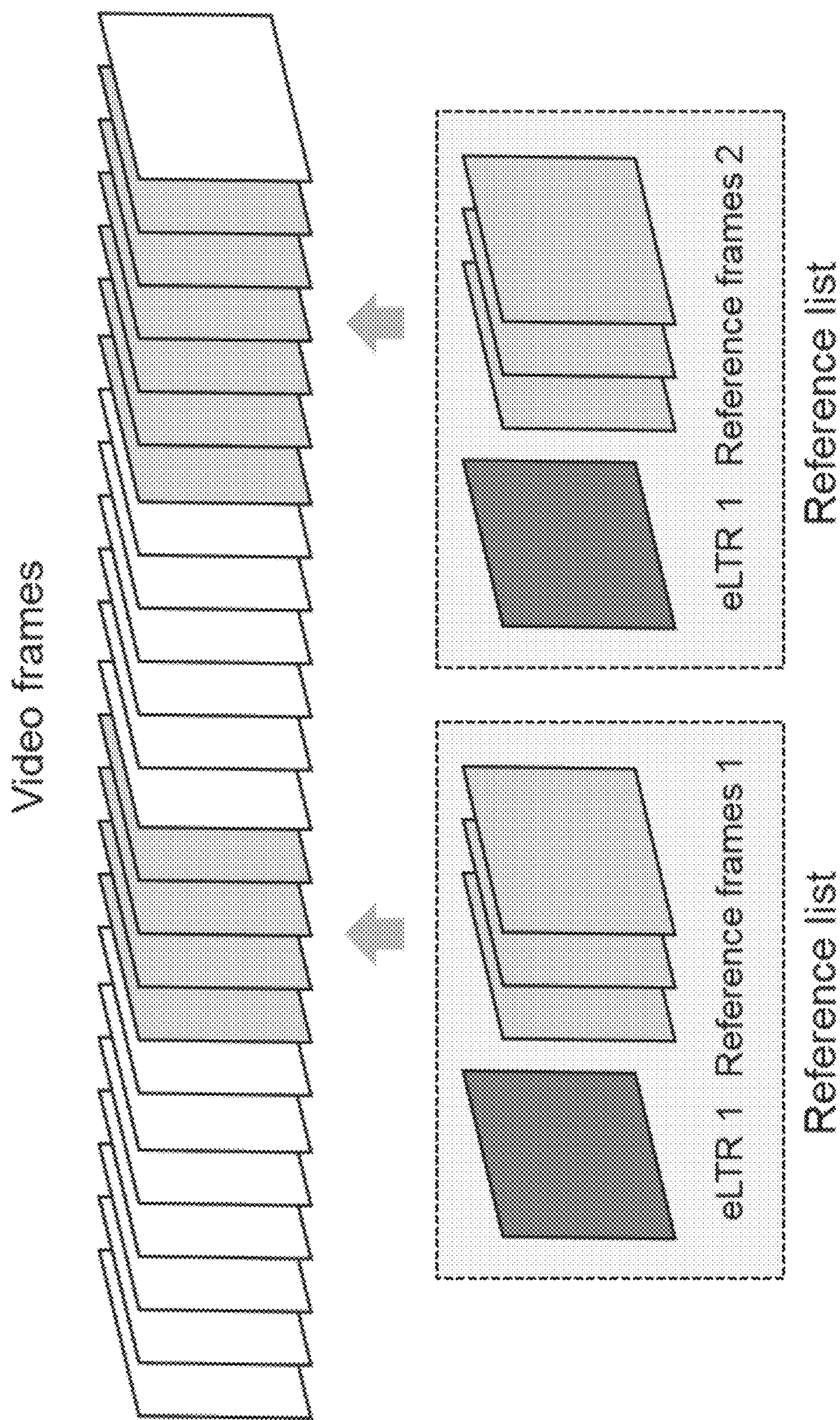
FIG. 1 illustrates an example reference list for frame prediction over a long period.

Some implementations of the current subject matter may achieve selection and retention of an eLTR frame in video coding. An eLTR may be retained in a picture reference list, which may be used by a current frame or group of frames for prediction. While all other frames in the list change over relatively short period, the eLTR can be retained in the reference list. For example, FIG. 1 illustrates an example reference list for frame prediction over a long period. As a non-limiting, illustrative example video frames shown as shaded may be reconstructed using reference frames. Reference list may contain frames that change over time and an eLTR that is retained.

In some implementations, and still referring to FIG. 1, an encoder conducts operation of eLTR selection and retention calculation. Selected frames and a time of retention may be signaled to decoder, for example, using pairs (eLTRn, TRn) indicating an index for the eLTR (eLTRn) and a retention time (TRn) for frame n. A decoder may retain frame eLTRn for a period of TRn in reference list. After eLTRn frame has resided in reference list for at least TRn, the eLTRn frame may be marked as unavailable for further use. In some implementations, eLTRn frame may be maintained in memory but in an unavailable state. In some implementations, encoder may explicitly signal a decoder to mark the eLTRn frame as available or as unavailable. For example, eLTRn frame previously marked as unavailable after passage of retention time TRn may be marked as available. Such feature may enable eLTRn to be used again in the future, such as for video containing scenes that switch back and forth. In some implementations, an encoder may include a signal in a bitstream for a decoder to remove eLTRn frame from memory. Decoder may remove eLTRn frame from reference list and memory based on such signal.

FIG. 2 is a process flow diagram illustrating a non-limiting example of a process 200 of eLTR frame retention in which an eLTR frame is retained in a reference list. Such eLTR retention may enable compression efficiency improvements compared to some existing approaches to video encoding and decoding.

At step 210, and still referring to FIG. 2, a bitstream is received by a decoder. Bitstream may include, for example, data found in a stream of bits that is an input to a decoder when using data compression. Bitstream may include information necessary to decode a video. Receiving may include extracting and/or parsing a block and associated signaling information from bitstream. In some implementations, receiving bitstream may include parsing eLTR frames, indices to such frames (eLTRn), and associated retention times (TRn), where retention time is based on frames decoded and/or time within the video.

With continued reference to FIG. 2, at step 220, an eLTR frame may be stored in the reference picture list.

At step 230, and still referring to FIG. 2 stored eLTR frame may be retained (e.g., maintained) in a reference list for a length of time based on an associated retention time (TRn).

At step 240, and still referring to FIG. 2, at least a portion of a video may be decoded from a bitstream. Decoding may include decoding a current block. For example, a received current coded block contained in bitstream may be decoded, for example, by using inter prediction. Decoding via inter prediction may include using a previous frame, a future frame, and/or eLTR frame as a reference for computing a prediction, which can be combined with a residual contained in bitstream.

Further referring to FIG. 2, for subsequent current blocks, an eLTR frame may be utilized as a reference frame for inter prediction. For example, a second coded block may be received. Whether an inter prediction mode is enabled for second coded block may be determined; determination may include receiving, from bitstream, an explicit signal indicating whether inter prediction mode is enabled. A second decoded block may be determined using eLTR frame as a reference frame and according to inter prediction mode. For example, the decoding via inter prediction may include using eLTR frame as a reference for computing a prediction, which can be combined with a residual contained in bitstream.

Figure 3:
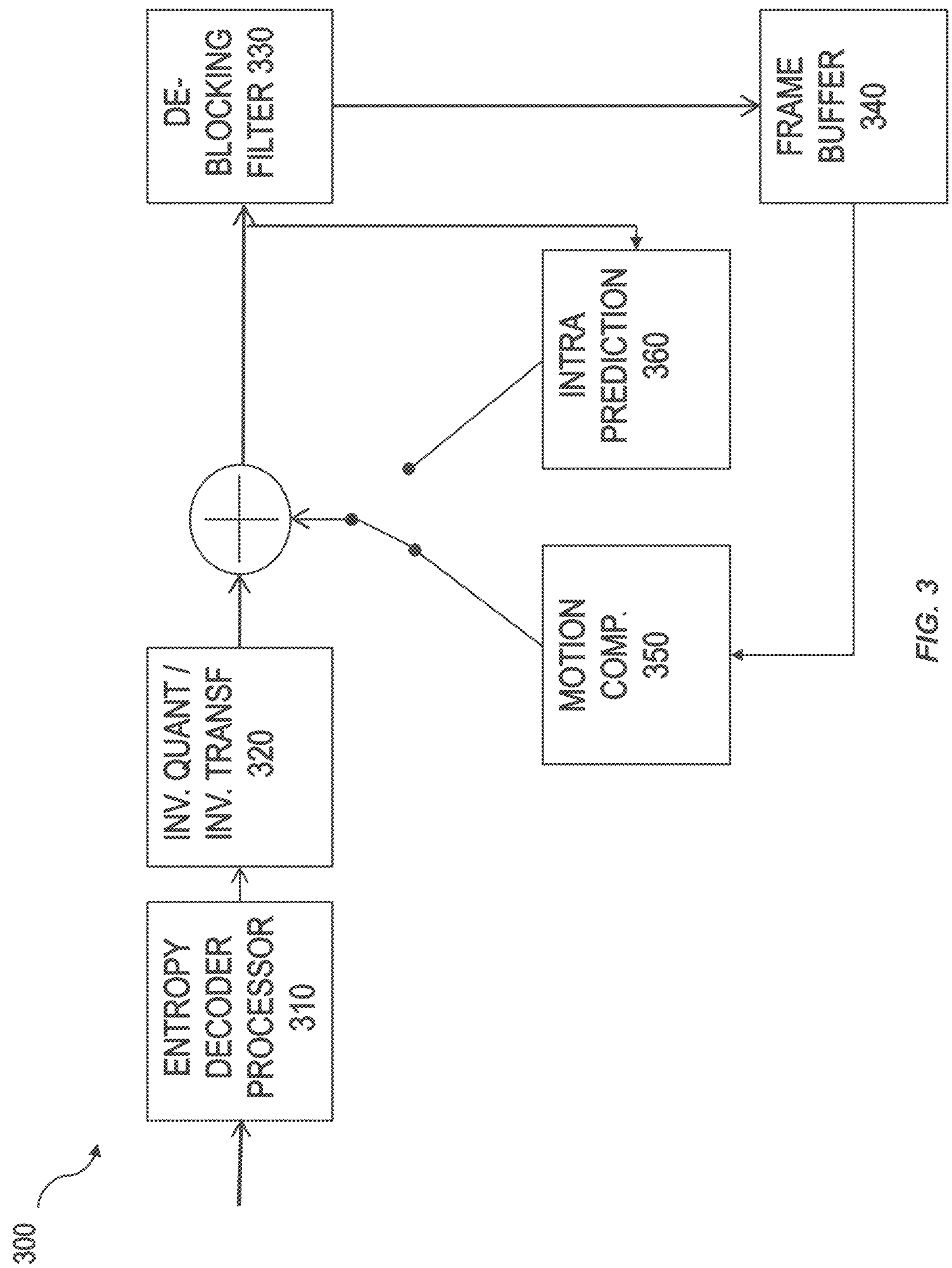
FIG. 3 is a system block diagram illustrating an example decoder capable of decoding a bitstream with eLTR frames retained in the reference list.

FIG. 3 is a system block diagram illustrating a non-limiting example of a decoder 300 capable of decoding a bitstream 370 with eLTR frames retained in a reference list. Decoder 300 may include an entropy decoder processor 310, an inverse quantization and inverse transformation processor 320, a deblocking filter 330, a frame buffer 340, motion compensation processor 350 and intra prediction processor 360. In some implementations, bitstream 370 may include parameters (e.g., fields in a header of the bitstream) that signal eLTR indices (eLTRn) and retention times (TRn). Motion compensation processor 350 may reconstruct pixel information using eLTR frames and retain the eLTR frames according to their associated retention times (TRn). For example, when an eLTR frame (eLTRn) is received and retained in the reference list for at least an associated retention time, an eLTR frame (eLTRn) may be used as a reference for inter prediction mode, at least during the associated reference time.

In operation, and still referring to FIG. 3, bitstream 370 may be received by decoder 300 and input to entropy decoder processor 310, which may entropy decode the bitstream into quantized coefficients. Quantized coefficients may be provided to inverse quantization and inverse transformation processor 320, which may perform inverse quantization and inverse transformation to create a residual signal, which may be added to an output of motion compensation processor 350 or intra prediction processor 360 according to a processing mode. An output of motion compensation processor 350 and intra prediction processor 360 may include a block prediction based on a previously decoded block and/or eLTR frames maintained in reference list. Sum of prediction and residual may be processed by deblocking filter 630 and stored in a frame buffer 640.

Figure 4:
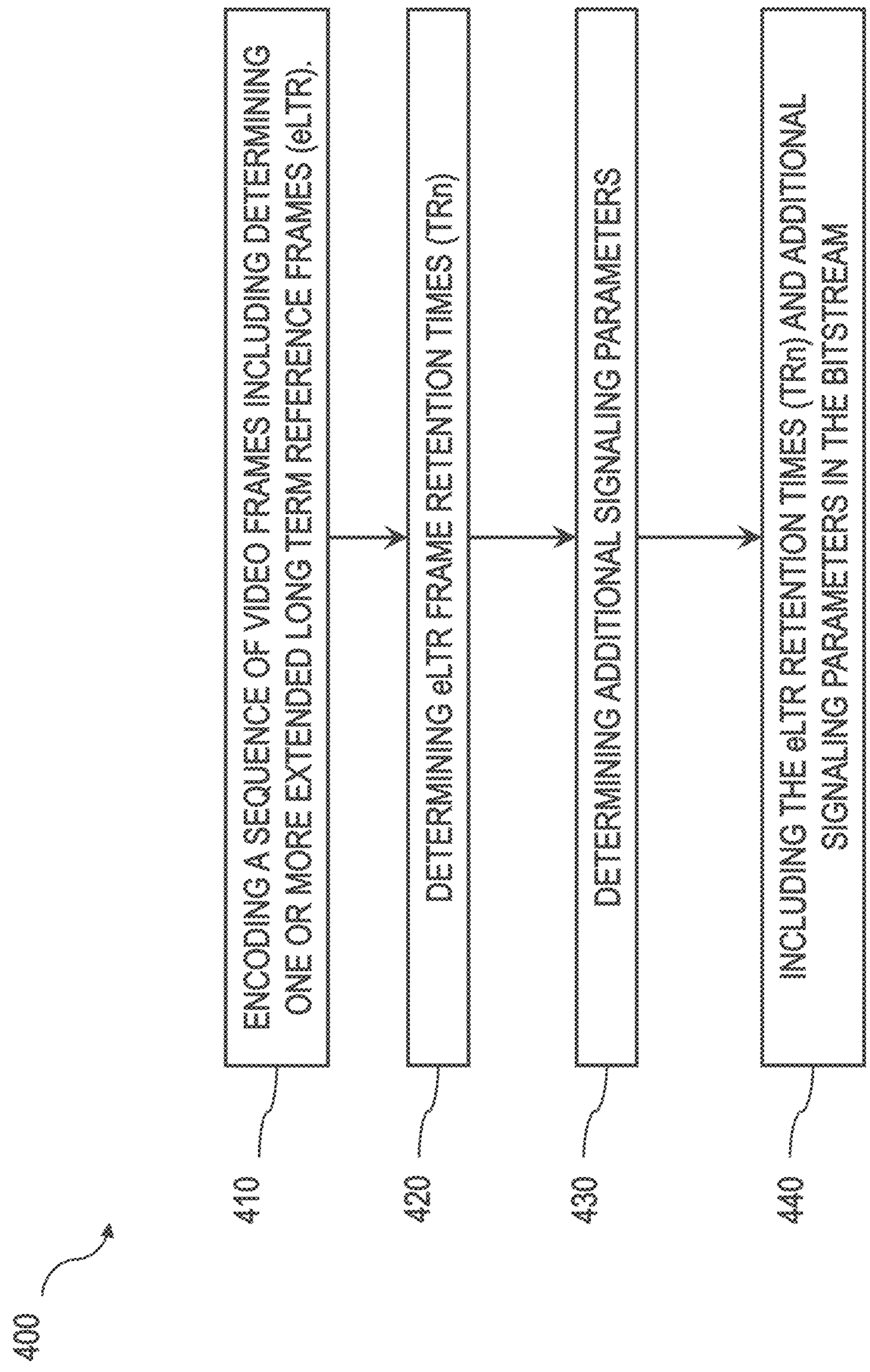
FIG. 4 is a process flow diagram illustrating an example process of encoding a video with eLTR frames retained in the reference list according to some aspects of the current subject matter that can enable compression efficiency improvements compared to some existing approaches.

FIG. 4 is a process flow diagram illustrating a non-limiting example of a process 400 of encoding a video with eLTR frames retained in the reference list according to some aspects of current subject matter that may enable compression efficiency improvements compared to some existing approaches. At step 410, a sequence of video frames may be encoded including determining one or more eLTR frames. At step 420, eLTR frame retention times (TRn) may be determined, for example, based on a length of time that an eLTR frame is utilized by encoder/decoder, where, for example, time is based on frames being decoded in a video.

At step 430, and still referring to FIG. 4, additional signaling parameters may be determined. For example, whether and when to mark eLTR frames as unavailable or available may be determined, and whether and when each eLTR frame should be removed from memory may be determined.

At step 440, and still referring to FIG. 4 eLTR retention time and additional signaling parameters may be included in a bitstream.

Figure 5:
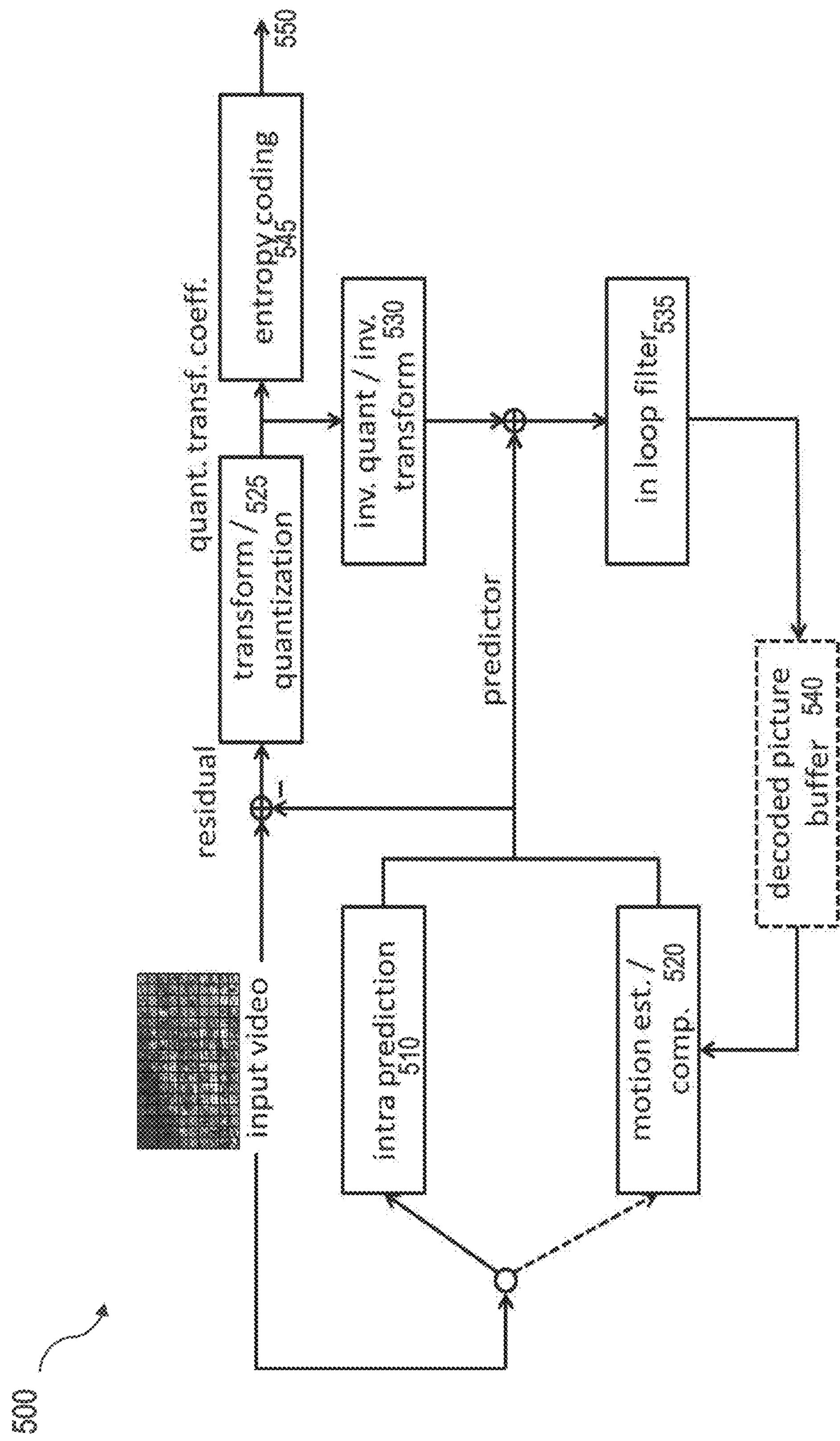
FIG. 5 is a system block diagram illustrating an example video encoder capable of signaling for eLTR retention in the reference list.

FIG. 5 is a system block diagram illustrating a non-limiting example of a video encoder 500 capable of signaling for eLTR retention in a reference list. Example video encoder 500 receives an input video 505, which may be initially segmented or dividing according to a processing scheme, such as a tree-structured macro block partitioning scheme (e.g., quad-tree plus binary tree). An example of a tree-structured macro block partitioning scheme may include a partitioning scheme partitioning a picture frame into large block elements which may be referred to for purposes of this disclosure as coding tree units (CTU). In some implementations, each CTU may be further partitioned one or more times into a number of sub-blocks called coding units (CU). A result of this portioning may include a group of sub-blocks that may be referred to for the purposes of this disclosure as predictive units (PU). Transform units (TU) may also be utilized.

Still referring to FIG. 5, example video encoder 500 may include an intra prediction processor 515, a motion estimation/compensation processor 520 (also referred to as an inter prediction processor) capable of supporting eLTR frame retention, a transform/quantization processor 525, an inverse quantization/inverse transform processor 530, an in-loop filter 535, a decoded picture buffer 540, and an entropy coding processor 545. In some implementations, motion estimation/compensation processor 520 may determine eLTR retention times and additional signaling parameters. Bitstream parameters that signal eLTR frame retention and additional parameters may be input to the entropy coding processor 545 for inclusion in output bitstream 550.

In operation, and continuing to refer to FIG. 5, for each block of a frame of input video 505, whether to process the block via intra picture prediction or using motion estimation/compensation may be determined. A block may be provided to intra prediction processor 510 or motion estimation/compensation processor 520. If block is to be processed via intra prediction, intra prediction processor 510 may perform processing to output a predictor. If block is to be processed via motion estimation/compensation, motion estimation/compensation processor 520 may perform processing including using eLTR frames as a reference for inter prediction, if applicable.

Continuing to refer to FIG. 5, a residual may be formed by subtracting predictor from input video. Residual may be received by transform/quantization processor 525, which may perform transformation processing (e.g., discrete cosine transform (DCT)) to produce coefficients, which may be quantized. Quantized coefficients and any associated signaling information may be provided to entropy coding processor 545 for entropy encoding and inclusion in an output bitstream 550. Entropy encoding processor 545 may support encoding of signaling information related to eLTR frame retention. In addition, quantized coefficients may be provided to inverse quantization/inverse transformation processor 530, which may reproduce pixels, which may be combined with predictor and processed by in loop filter 535, an output of which may be stored in a decoded picture buffer 540 for use by a motion estimation/compensation processor 520 that is capable of supporting eLTR frame retention.

Still referring to FIG. 5, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and continuing to refer to FIG. 5, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control risk of false prediction.

In some implementations, a decoder may include an eLTR frame retention processor (not shown) that determines whether and when to mark eLTR frames as unavailable or remove from a reference list.

In some implementations, the current subject matter can be applied to a broadcast (and similar) scenario in which, in the middle of a retention period, a decoder tunes in. In order to support standard playback, an encoder may mark (e)LTR frame as an Instantaneous Decoding Refresh (IDR) type frame. In this case, streaming may resume after the next available LTR (IDR) frame. Such an approach may be similar to some current broadcast standards, which specify inter-frames as IDR frames.

The subject matter described herein provides many technical advantages. For example, some implementations of the current subject matter may provide for decoding blocks using an eLTR frame retained in the reference list. Such approaches may improve compression efficiency.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
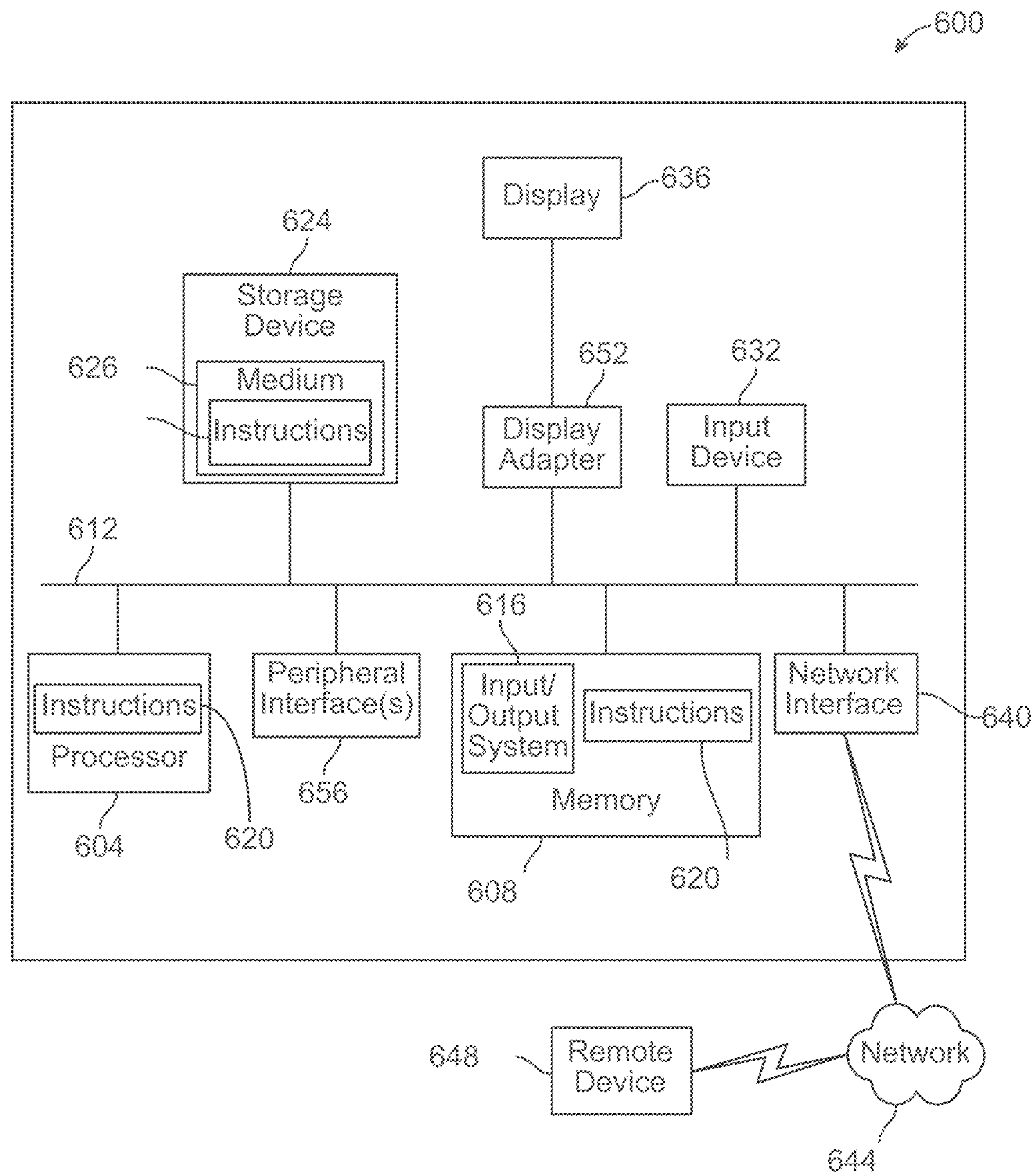
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A video encoder configured to encode a bitstream to be received by a decoder which is configured to:

receive a bit stream including signaling information and a plurality of coded pictures including first coded picture, second coded picture, and a subsequent coded picture;

decode the plurality of pictures including the first, second and subsequent pictures and store the decoded pictures in a decoded picture buffer, where the decode comprises:

decoding the first picture by forming a first list of active reference pictures from the pictures in the buffer, one of the active reference pictures being a long term reference picture which is an Instantaneous Decoding Refresh (IDR) picture, and decoding a block of said first picture using the long term reference IDR picture;

decoding the second picture by forming a second list of active reference pictures from the pictures in the buffer, said second list not including the long term reference IDR picture and, in response to at least one parameter in the signaling information, indicating that the long term reference IDR picture is inactive as a reference picture while continuing to store the long term reference IDR picture in the buffer; and decoding the subsequent picture by forming a subsequent list of active reference pictures from the pictures in the buffer including, in response to at least one parameter in the signaling information, changing the indication of the long term reference IDR picture from inactive to active as a reference picture and including the long term reference IDR picture in the subsequent list, and decoding a block from the subsequent picture using the long term reference IDR picture.

2. The encoder of claim 1 further configured to provide signaling information to mark the long term reference picture as unused for reference and remove the long term reference picture from the buffer.

3. The encoder of claim 1, wherein signaling information includes a time related parameter indicating that the long term reference picture is inactive.

4. The encoder of claim 1, wherein the bitstream is a single view bitstream.

5. The encoder of claim 1, wherein the bitstream includes a signal to remove the at least a first picture from the buffer.

* * * * *